United States Patent [19]

Reinsch

[11] 4,347,623
[45] Aug. 31, 1982

[54] FLASH JET COOLANT PUMPING SYSTEM

[76] Inventor: A. O. Winfried Reinsch, 13140 Carousel La., Del Mar, Calif. 92014

[21] Appl. No.: 173,416

[22] Filed: Jul. 29, 1980

Related U.S. Application Data

[63] Continuation of Ser. No. 920,985, Jun. 30, 1978, which is a continuation-in-part of Ser. No. 684,853, May 10, 1976, abandoned.

[51] Int. Cl.³ .............................................. G21C 15/18
[52] U.S. Cl. .................................. 376/392; 376/372; 376/407
[58] Field of Search .................... 176/37, 38, 50, 54, 176/56, 60, 61, 65; 261/36 R; 122/31 R, 33, 407; 417/196; 376/372, 392, 407

[56] References Cited

U.S. PATENT DOCUMENTS

| | | | |
|---|---|---|---|
| 2,521,215 | 9/1950 | Haddeland et al. | 261/36 R |
| 3,103,917 | 9/1963 | Bauer et al. | 122/33 |
| 3,371,618 | 3/1968 | Chambers | 417/196 |
| 3,445,335 | 5/1969 | Gluntz | 176/54 |
| 3,565,761 | 2/1971 | Hines | 176/56 |
| 3,575,807 | 4/1971 | Ripley | 176/56 |
| 3,625,820 | 12/1971 | Gluntz | 176/54 |
| 3,718,539 | 2/1973 | West et al. | 176/38 |
| 3,859,166 | 1/1975 | Flynn et al. | 176/37 |
| 4,051,892 | 10/1977 | Reinsch | 176/60 |

FOREIGN PATENT DOCUMENTS 887252  1/1962  United Kingdom .................. 176/38

Primary Examiner—Sal Cangialosi
Attorney, Agent, or Firm—Brown & Martin

[57] ABSTRACT

The system removes heat from a vessel containing the source of heat, utilizing hot water heated by energy released in the vessel as the power supply. The hot water passes through a subcooler and a convergent-divergent nozzle of a flash jet pump where it is accelerated to supersonic velocity. Cold water is drawn into the flash jet pump by the supersonic flow generated and mixes with the water flashed into steam. The mixture is condensed and forced under pressure through connecting pipes into the pressure vessel. A second flash jet pump is utilized to initially fill the vessel with coolant water.

14 Claims, 5 Drawing Figures

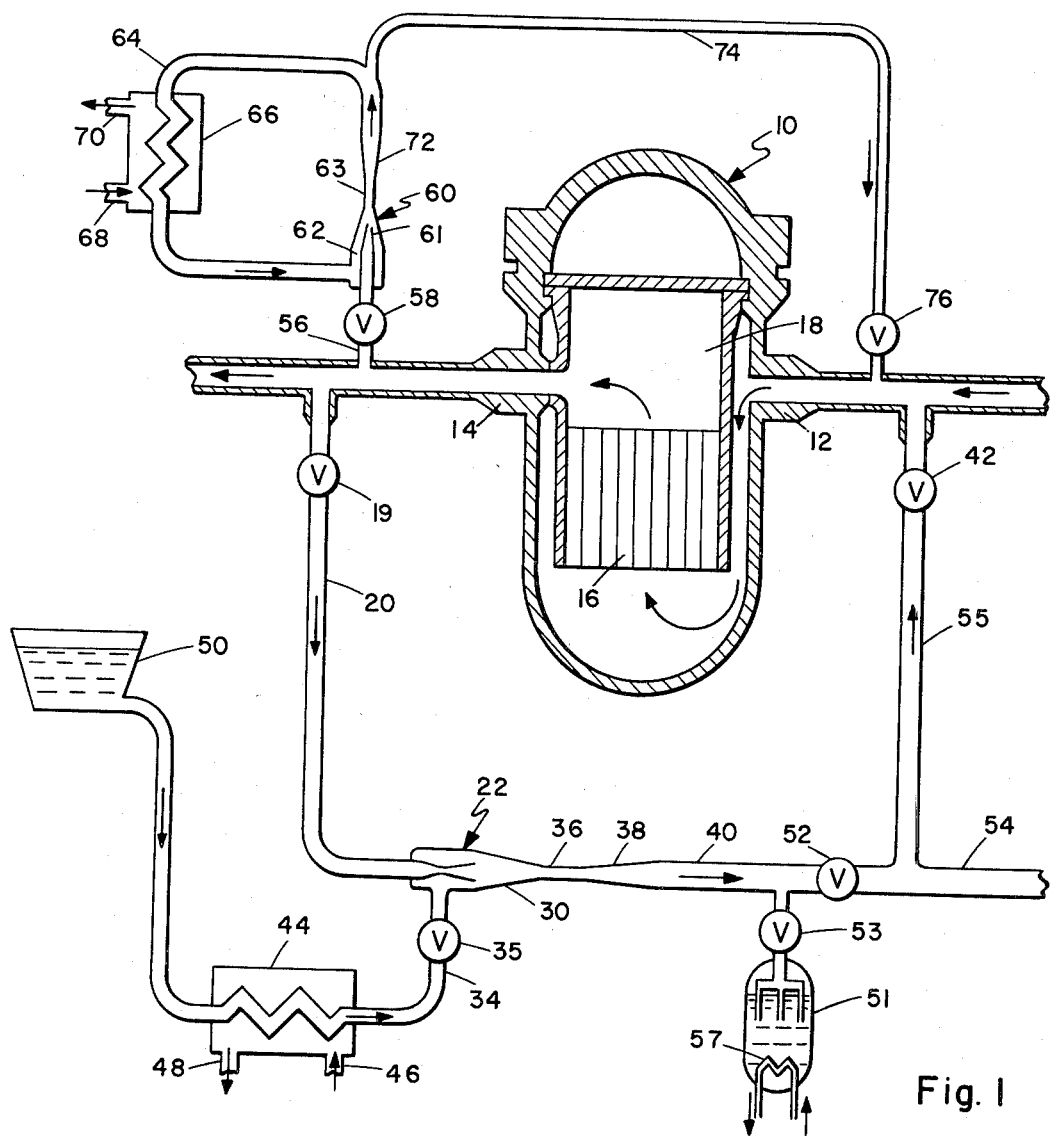
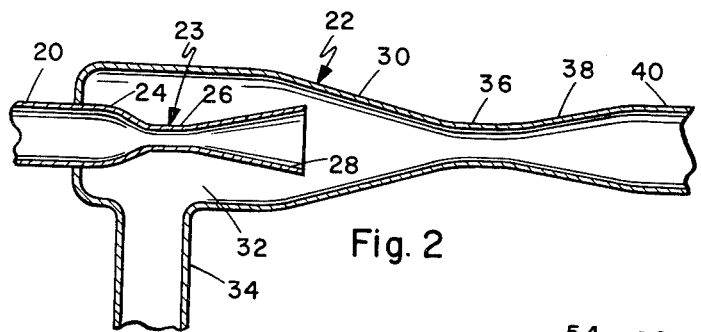
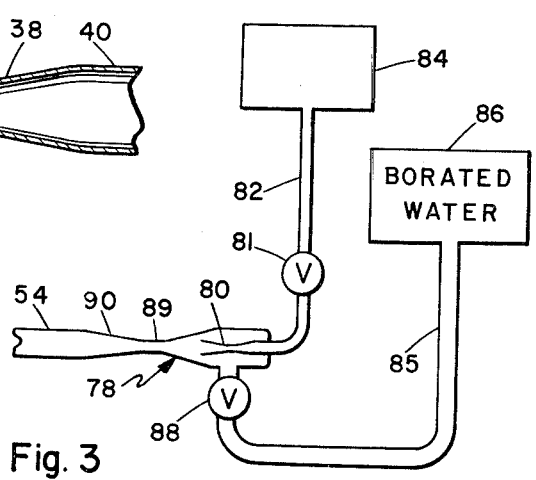
Fig. 1
Fig. 2
Fig. 3

FLASH JET COOLANT PUMPING SYSTEM

This is a continuation of application Ser. No. 920,985, filed June 30, 1978; which was a continuation-in-part application Ser. No. 684,853 filed May 10, 1976 for "Flash Jet Coolant Circulation System," now abandoned.

BACKGROUND OF THE INVENTION

Pressurized-water and boiling-water nuclear reactors utilize a vessel to contain the fuel rods with their associated fissionable material. Coolant water is circulated through the vessel and is heated (PWR) or partially vaporized (BWR) by heat transfer from the fuel rods. The heated coolant of a PWR is utilized to vaporize a secondary through heat exchangers. In the power generation application of nuclear reactors, the vapor powers a steam turbine rotating a generator.

In the event that a malfunction of the system takes place so that the normal coolant circulation is interrupted, the reactor is shutdown by inserting absorber rods into the core, thereby interrupting the nuclear reaction. However, even after shutdown of the reactor, the fission products in the fuel rods continue to produce heat generally referred to as "decay heat". Without the normal coolant flow, this decay heat could melt the fuel rod cladding, the fuel, and the vessel itself, releasing radioactive fission products into the secondary containment building and thereby increasing the risk that radioactive material would be introduced into the atmosphere with the associated potential danger to the public.

The potential for release of radioactive material into the environment has led to the development of emergency core-cooling systems. All nuclear reactors must now have provision for maintaining sufficiently low temperatures after a malfunction that the integrity of the fuel rods will be insured. The primary malfunction with which the emergency core-cooling systems are concerned is a loss-of-coolant accident. In such an accident, the primary coolant system develops a leak or rupture resulting in some of the primary coolant water being lost from the system. When the leak is a relatively minor one, the primary coolant system can continue to function to cool the core after the shutdown so long as the small quantity of coolant being lost is replenished. The replenishment of coolant through a small leak is accomplished by a high-pressure injection system. However, in the event of a large rupture developing in the primary coolant system, a different emergency core-cooling system becomes effective. According to conventional design, such an emergency core-cooling system operates in two distinct phases. Initially, accumulator tanks are discharged and/or pumps operated to rapidly refill the vessel with borated coolant water. Subsequently, the new coolant is circulated through the pressure vessel. Steam leaking into the reactor containment is condensed, removing the reactor heat from the system. Power for the pumps is obtained from an independent power source such as a Diesel engine. Typically, a complete emergency core-cooling system injects water into each of the primary coolant loops of the reactor so that the break in a single coolant loop will not defeat the operation of the emergency core-cooling system, pumping water into the other primary coolant loops.

It will be apparent that the provision of such systems sufficient to maintain a safe temperature within the vessel is an expensive and critical component of the overall power generating system. Such conventional emergency core-cooling systems are rendered more expensive and less reliable because each of the possible contingencies for such a system's operation adds further to the design capacity requirements. For example, Diesel generator sets have a high startup failure rate, requiring a backup electric system to increase the reliability. A critical time lag may develop before the cooling water from the pumps is injected. Water coming into contact with the hot core is then partially vaporized by the fuel elements. The steam in the vessel collects in the plenum of the vessel producing a back pressure to the entry of new coolant water. The steam problem, generally referred to as "steam binding", limits the design of the reactor plant so that the initial temperature rise caused by the steam binding effect does not endanger the integrity of the reactor core.

Therefore, it is desirable to have a system for removing heat from the vessel that increases the reliability of decay heat rejection from the reactor after an accident and has a short startup time. Such a system is particularly desirable if it is capable of operating independently of an electrical power source.

SUMMARY OF THE INVENTION

An exemplary embodiment of the invention will be described in association with a pressurized-water reactor. However, it is to be understood that the system has also application in other reactor systems incorporating a circulating coolant and that the system in particular has application to a boiling-water reactor. In the exemplary embodiment, the dependence on electric power systems of prior art emergency core-cooling systems is overcome by utilizing the energy from the reactor itself to power the emergency system. The heat energy is utilized by a unique jet pump providing operating characteristics closely corresponding to the requirements for emergency core-cooling over a wide range of failure types. A subcooler for increasing the differential between the saturation temperature of the coolant water for the then existing pressure and coolant water temperature further enhances the characteristics of the jet pump design. The subcooler and jet pump together are designed to accommodate the coolant in such a manner that substantially all the flashing of the coolant into steam will occur in the divergent section of the nozzle. Since flashing does not take place in the throat of the nozzle, the flow does not reach sonic velocity (become choked) in the nozzle throat and the pump produces an almost constant mass flow rate over a wide range of temperature/pressure relationships. Because flashing in hot water in the nozzle is the driving force that distinguishes the jet pump according to the invention, the pump is referred to hereinafter as the flash jet pump.

The flash jet pump is further distinguished from conventional designs in its use of an extremely high expansion area ratio. Expansion area ratio refers to the ratio between the size of the nozzle outlet area to the nozzle throat area. For conventional jet pumps, this ratio is over a maximum range of 1:1 to 8:1. In the flash jet nozzle, the area ratio is in the range of 10:1 to 50:1. The high area ratio is caused by the high density of liquid water compared to that of steam and the fact that flashing is suppressed in the convergent nozzle section. The supersonic two-phase flow exiting the divergent nozzle impinges upon coolant water drawn into the suction side of the flash jet pump. The mixing of the supersonic two-phase jet with the coolant water produces a combined high-velocity flow which is converted into a pressure rise for pumping. The pressure rise is increased by a divergent section in the conduit so that substantially all of the remaining kinetic energy of the water is converted into pressure for forcing the combined coolant flow through the inlet connection into the reactor vessel. The coolant water is drawn from a supply of additional coolant. The source of supply of the additional coolant is a storage tank or the reactor building sump. The reactor building sump collects the water lost from the primary cooling loop due to the break. Thus, the system becomes self-sustaining with the water being lost from the reactor vessel being picked up by the flash jet pump and recirculated.

For maximum advantage, the subcooler is in the form of a downcomer pipe connected to the outlet connection of the vessel and having a vertical extent of 20 to 40 feet. The effect of the downcomer pipe is to apply a static pressure head on top of the circulating pressure of the coolant thereby raising the saturation temperature and increasing the differential between the saturation temperature and coolant water temperature. For the capability of the system to deal with a wide range of loss-of-coolant accidents and to minimize fuel rod damage under all circumstances, operation of the system in its transfer mode for reflooding the vessel with an initial charge of coolant water is necessary. The operation of such a transfer system assumes that the rupture is sufficiently large that a substantial coolant fraction is lost from the vessel. The transfer system is utilized to transfer borated water into the vessel in the minimum possible time. The pump for the transfer system incorporates the same principles previously described in association with the recirculation system. That is, the pump is a flash jet pump powered by hot water generated by the reactor heat. THe hot water can be taken from the secondary side of the steam generator or from a hot water storage tank. The steam generators contain a substantial quantity of heated water at the moment of a loss-of-coolant accident. Since the transfer system must operate only for an initial period, a finite quantity of heated water is sufficient to refill the reactor vessel. A subcooler is connected to the flash nozzle. The subcooler is a downcomer pipe with a vertical elevation difference between the hot water tank and flash jet pump. Cold water is drawn from a storage tank containing borated water by the flash jet pump and discharged into the reactor vessel.

It is therefore an object of the invention to provide a new and improved flash jet coolant pumping system.

It is another object of the invention to provide a new and improved flash jet coolant pumping system that has few moving parts.

It is another object of the invention to provide a new and improved flash jet coolant pumping system with a highly reliable cooling action.

It is another object of the invention to provide a new and improved flash jet coolant pumping system which operates over a wide pressure range.

It is another object of the invention to provide a new and improved flash jet coolant pumping system that reliably transfers an initial charge of water into a reactor vessel.

Other objects and many attendant advantages of the invention will become more apparent upon a reading of the following detailed description together with the drawings in which like reference numerals refer to like parts throughout and in which:

BRIEF DESCRIPTION OF THE DRAWINGS

FIG. 1 is a diagramatic representation of the system including the flash jet coolant pumping system.

FIG. 2 is a sectional view of the flash jet pump.

FIG. 3 is a schematic representation of the transfer system.

DETAILED DESCRIPTION OF THE DRAWINGS

Figure 4:
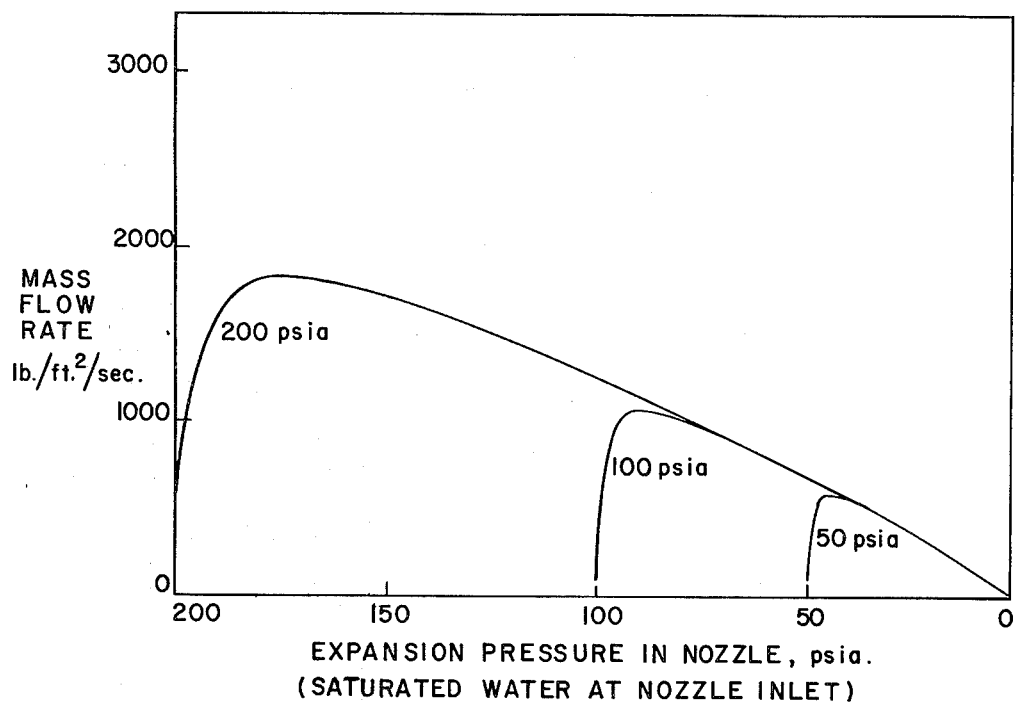
FIG. 4 and FIG. 5 are diagrams showing the mass flow rate versus expansion pressure without and with subcooling respectively.

Referring now to the drawings, there is illustrated a reactor vessel 10 with inlet connection 12 and outlet connection 14. A single cooling loop is illustrated. However, it is to be understood that in the typical case the reactor vessel would have three or more coolant loops. The system of the invention to be described hereinafter could be applied to one or all of the additional coolant loops.

The vessel houses a reactor core 16 incorporating the fuel rods and associated structure. In normal operation, coolant water enters via the inlet connection 12, passes down along the reactor core 16 and then up through the reactor core into a plenum 18 to exit the vessel 10 through the outlet connection 14. For operation of the system according to the invention, the valve 19 is opened to permit the coolant water that has been heated by being passed through the reactor core 16 to enter the downcomer pipe 20. As noted, the downcomer pipe functions as a subcooler by the hydrostatic pressure developed through the vertical extent of the downcomer pipe which increases the difference between the saturation temperature of the coolant and the then existing temperature of the coolant by raising the coolant saturation temperature above the then existing coolant temperature of the coolant. The subcooling effect is obtained without loss of coolant temperature or heat loss. However, it should be noted that the subcooling could be obtained by the injection of cold water from a separate cold-water source or could be obtained by a heat exchanger. The output of the subcooler is connected to the flash jet pump 22.

The flash jet pump 22 is shown in FIG. 2 to comprise a nozzle 23 incorporating a convergent section 24, throat 26 and divergent section 28. The entire nozzle 23 is contained within a housing 30 producing an annulus 32 surrounding the nozzle 23. Coolant to replace the coolant loss by a rupture in the primary cooling circuit is drawn through the conduit 34. One source for the make-up coolant is the building sump 50 which collects the coolant lost from the primary cooling system. The coolant passing through the reactor core takes on the heat being developed by the decay heat of the reactor core. A heat exchanger 44 removes heat from the make-up coolant to maintain a system equilibrium. Secondary coolant water for this purpose is available in the event of an emergency. The secondary coolant water passes into the heat exchanger from connection 46 and is drawn off from the heat exchanger at connection 48. A valve 35 in the make-up coolant conduit 34 prevents water from the sump 50 from entering the jet pump 22 and subcooler 20 before the jet pump commences operation. The make-up coolant and the supersonic two-phase flow from the flash jet nozzle 23 pass from the housing into a high-velocity flow section 36 and then into a diffuser section 38. Even after partial mixing of the two streams in section 36, the combined flow is still at supersonic speed until a compression shock completes the mixing and condensation process, generating a substantial pressure rise for pumping the combined flow into the vessel. Thus, the high-velocity section and diffuser section 38 convert the kinetic energy from the high-velocity flow into static pressure in conduit 40 thereby pumping the flow against the hydrostatic pressure head through an open valve 52 and through the inlet connection 12 into the vessel 10.

Flash jet pump 22 has a nozzle area ratio (the ratio of the nozzle outlet area to the nozzle throat area) in the range of 10:1 to 50:1. Flashing of hot water in the divergent nozzle section produces supersonic flow at the nozzle outlet. Thus, the thermal energy of the hot water is converted into the kinetic energy of a supersonic two-phase jet. The combination of the subcooler 20 and the convergent nozzle section result in incompressible flow in the convergent section 24 and throat 26, converting into compressible flow in the divergent nozzle section 28. The subcooler 20 interaction with the nozzle 23 results in a steady outlet pressure that is essentially independent of the inlet pressure. This is an important stabilizing effect in conjunction with the flow rate stabilization that is described more fully hereinafter.

A startup tank 51 is utilized to maintain a pressure substantially lower than the pressure in the leg of the system incorporating the jet pump 22. A reduced pressure is a prerequisite to the operation of the jet pump 22. Reduced pressure is required to cause flashing and acceleration to supersonic speed of the hot water in the divergent section of the nozzle. After startup, the high-velocity flow and condensation produces a self-sustaining low pressure region for both the pump operation and for the suction of the make-up coolant through conduit 34. The reduced pressure is produced in the startup tank 51 by collecting by gravity in the tank 51 all the water in the subcooler pipe 20, jet pump 22 and conduit 40 and then cooling the water by cold water flow through the coil 57. Cooling of the water causes a partial condensation of water vapor in tank 51 thereby reducing the total pressure in the leg. After the system is operational, the valve 53 may be closed.

The initial charge of coolant into the reactor vessel after a loss-of-coolant accident is provided by a transfer system from a storage tank 86 containing a quantity of borated water, as in FIG. 3. Motive power for the pumping action is provided by hot water in a flash jet pump 78 which is essentially similar in its structural particulars to the flash jet pump 22 with exceptions set forth hereinafter. Hot water to power flash jet pump 78 is provided from a hot-water storage tank or the secondary side of the heat exchanger 84 through a subcooler in the form of downcomer pipe 82. The subcooled water passes through a valve 81 into the convergent-divergent nozzle 80 producing supersonic flow that draws the borated water through the conduit 85 and valve 88. The resulting combined flow enters a high-velocity section 89 and passes into the diffuser section 90. An increase in pressure of the resultant flow is produced which is sufficient to force the borated water through conduit 54 and up the conduit 55 through valve 42 and into the inlet connection 12 of the reactor vessel 10. The flash jet pump 78 operates from heated water on the secondary side of the heat exchanger or a storage tank which is always available subsequent to normal operation of the nuclear reactor. The immediate startup of the flash jet pump 78 is obtained by opening the valves 81, 88 and 42. No other moving parts or additional valves are essential to the operation.

The area ratio of the nozzle 80 in the flash jet pump 78 in this application is in the range of 15:1 to 70:1. Since the pressure in the secondary side of the heat exchanger will not vary as much as the potential pressure variations in the reactor vessel, it may be possible to reduce or eliminate the subcooler in some applications.

Figure 5:
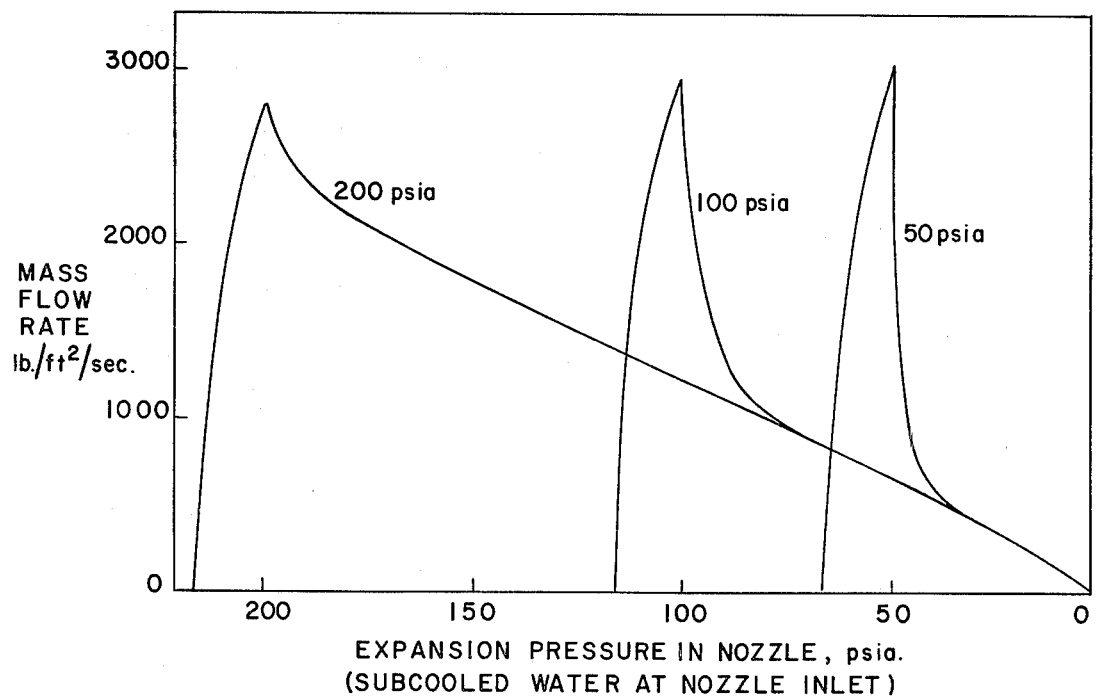

Referring particularly to FIGS. 4 and 5, the contrast between choked flow (sonic velocity) and flow in the flash nozzle are illustrated. FIG. 4 illustrates the effect of the inlet pressure on a supersonic nozzle with no subcooling. The maximum mass flow rate for an inlet pressure of 200 p.s.i.a. is substantially three times that for an inlet pressure of 50 p.s.i.a. It will be apparent that with such a system, the design criterion would be strongly dependent upon the minimum pressure at which the system must operate and the system would have excess capacity at all other pressures. As previously noted, the expansion pressure at the outlet of the supersonic nozzle is proportional to the inlet pressure.

Referring now to FIG. 5, there is illustrated the mass flow rate versus expanion pressure relationship for the subcooled case. It will be seen that the maximum flow rate does not increase with the inlet pressure. For a given nozzle design, the expansion pressure at the nozzle outlet is independent of the inlet pressure. Thus, a highly stable relationship exists and a constant mass flow rate will be produced substantially independent of the system pressure over a wide range.

Having described my invention, I now claim:

1. A system using the energy of heated water for pumping water into a vessel, such system comprising:
    a flash jet pump having a nozzle with converging and diverging sections, said converging section being connected to receive water from the source of saturated water, said converging and diverging sections being sized for, and comprising means for, flashing a portion of said saturated water into steam, in said divergent section of said nozzle and producing a super-sonic two-phase flow wherein the ratio of the nozzle outlet area to the nozzle throat area is in the range of 10:1 to 50:1,
    a housing surrounding said flash jet pump,
    a source of cooled water that is cooler than said heated water connected to said housing for being drawn into said super-sonic two-phase flow downstream of said divergent section of said nozzle,
    the outlet of said flash jet pump is connected to discharge the combined flow of said saturated water and said cooled water into said vessel.

2. The system of claim 1 wherein:
    said source of heated water is in said vessel and said flash jet pump being connected to circulate said heated water, with the addition of said cooled water back into said vessel.

3. The system of claim 1, wherein:
    the ratio of nozzle outlet area to nozzle throat area is greater than 15.

4. The system according to claim 1 further including:
    a mixing and diffuser means downstream of the point where said cooled water is drawn into said two-phase flow, said mixing and diffuser means for increasing the pressure of the combined water flow, and producing a condensation shock.

5. The system according to claim 1, wherein:
said flash jet pump means includes subcooler means, said subcooler means being connected to receive water from the outlet connection of the vessel for subcooling water from said vessel so that the temperature of said water is below the saturation temperature.

6. The system according to claim 1, wherein:
said source of cooled water incorporates a sump for collecting coolant water lost from said vessel.

7. The system according to claim 6, further including:
heat rejection means connected to said sump for receiving water from said sump and rejecting heat from said coolant water.

8. The system according to claim 1, further including:
a transfer system connected to inject water into the inlet connection of said vessel for filling said vessel with water, said transfer system comprising a transfer flash jet pump means said transfer flash jet pump means incorporating a nozzle with convergent and divergent sections connected to a source of water for pumping coolant water into said vessel,
a source of hot water connected to said convergent section of said transfer jet pump means for powering said transfer flash jet pump means.

9. The system according to claim 1, wherein:
the ratio of nozzle outlet area to nozzle throat area is at least 10.

10. The system according to claim 8, wherein:
the ratio of nozzle outlet area to nozzle throat area is greater than 15.

11. A transfer system for injecting water into a nuclear reactor vessel utilizing heat stored in a liquid coolant comprising:
a transfer flash jet pump incorporating a nozzle with convergent and divergent sections and having an inlet section connected to a source of water,
a source of liquid coolant,
said source of liquid coolant is connected to said convergent section of said transfer flash jet pump means,
said nozzle comprises means for suppressing the flashing of said coolant into said divergent section of said nozzle and for flashing said coolant partially into steam in the divergent section of said nozzle wherein the ratio of the nozzle outlet area to the nozzle throat area is in the range of 10:1 to 50:1.

12. The system according to claim 11, wherein:
said nozzle has an area ratio of greater than 15.

13. The system according to claim 5, wherein:
said subcooler means comprises a downcomer pipe having an output connected to said flash jet pump means vertically below said outlet connection.

14. The system according to claim 13, wherein:
the output of said downcomer pipe is more than 10 feet below said outlet connection.

* * * * *